Jan. 20, 1970    R. D. HIPP, JR., ET AL    3,490,839
DISPLAY APPARATUS
Filed Nov. 15, 1967    3 Sheets-Sheet 1
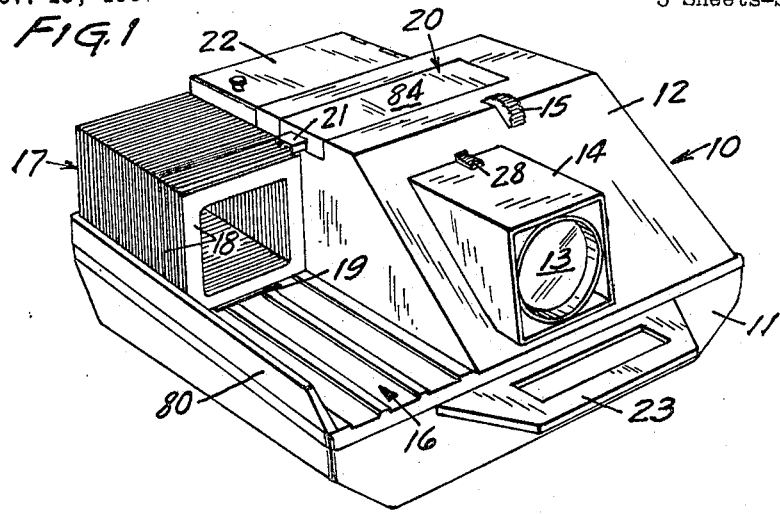
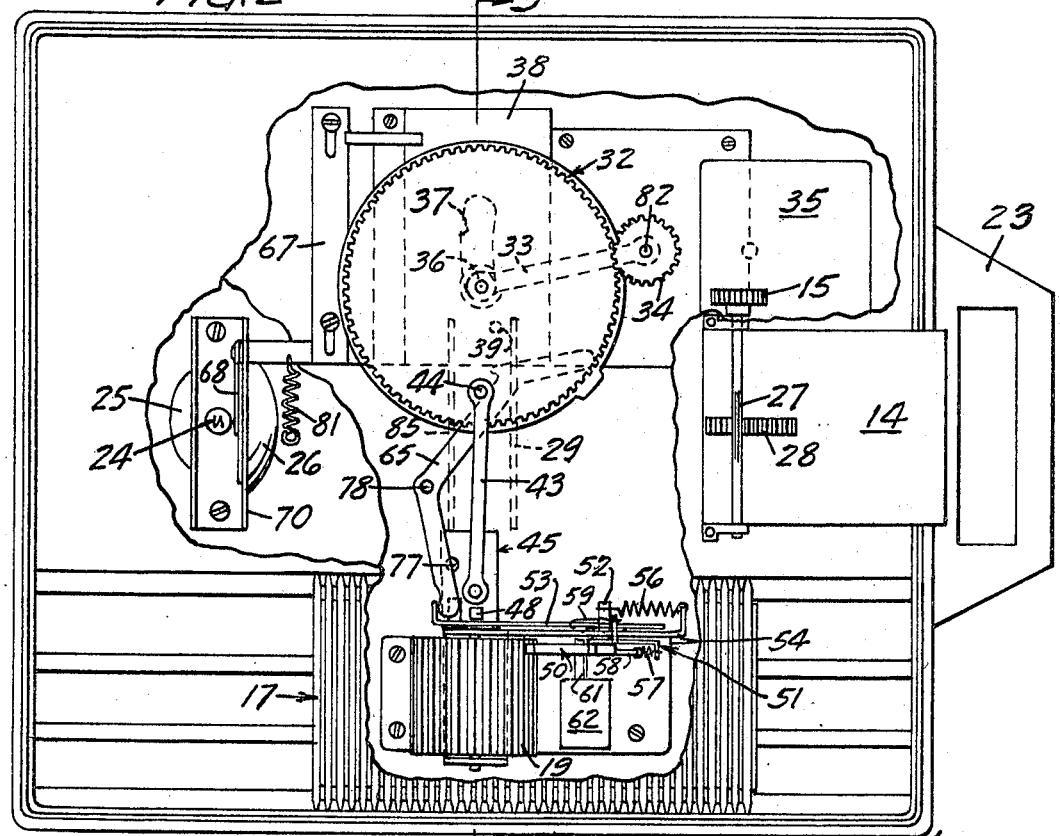
INVENTORS
RICHARD D. HIPP, JR.
LYLE B. LA CORE
ROGER H. APPELDORN
BY Carpenter, Kinney & Coulter
ATTORNEYS Jan. 20, 1970    R. D. HIPP, JR., ET AL    3,490,839
DISPLAY APPARATUS Filed Nov. 15, 1967    3 Sheets-Sheet 3

INVENTORS
RICHARD D. HIPP, JR.
LYLE B. LACORE
ROGER H. APPELDORN
BY Carpenter, Kinney & Boulter
ATTORNEYS

United States Patent Office 3,490,839
Patented Jan. 20, 1970

3,490,839
DISPLAY APPARATUS
Richard D. Hipp, Jr., Circle Pines, Lyle B. La Core, West St. Paul, and Roger H. Appeldorn, White Bear Lake, Minn., assignors to Minnesota Mining and Manufacturing Company, St. Paul, Minn., a corporation of Delaware
Filed Nov. 15, 1967, Ser. No. 683,262
Int. Cl. G03b 21/14, 23/04
U.S. Cl. 353—116       9 Claims

ABSTRACT OF THE DISCLOSURE

Projection apparatus, for exhibiting a series of projection transparencies from a unified pack of slides, comprises a light source, projection optics including a twin Fresnel condenser, pack indexing means, slide removal and return means, and pack stabilizer means.

---

Figure 3:
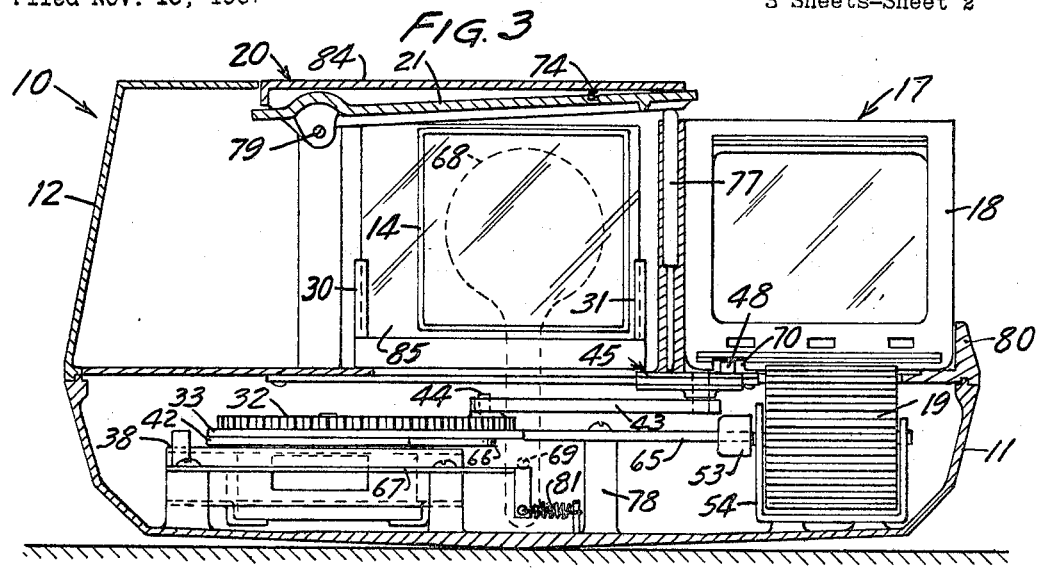

This invention relates to slide projectors adapted for projecting images from slides or transparencies onto a viewing screen.

Various systems are known for handling slides during projection. An early system involved placing the slides one at a time into a slot in the projector housing. More recent projectors employ slide cartridges or trays containing a number of slides in separate slots, the slides being mechanically advanced from the tray into the projector and returned, and the tray then being mechanically indexed to a next position. The slides are loosely supported in the tray and are easily spilled or lost. The trays are expensive and space-consuming. Any change in the desired order involves a complete re-positioning of the subsequent slides.

In U.S. Patent application Ser. No. 557,487, filed June 14, 1966, now Patent No. 3,419,987, there is described an improved slide device in the form of a two-piece slide mount for framing a projection transparency and having angularly extending fins or ridges across both front and back faces. The fins are cooperatively positioned to form mortise and tenon structures which permit adjacent slides to be slidably interconnected into a unified pack of slides, thereby eliminating any necessity for a separate slide cartridge. Individual slides may be removed, and new slides added, without any laborious re-positioning of the individual slides in the remainder of the pack.

The present invention provides means for handling slides of the type described in Ser. No. 557,487. Packs containing any reasonable number of individual slides may be conveniently handled. The remaining elements of the pack are held firmly in place during removal and return of an individual slide. Both manual and automatic operation are possible.

These and other advantages are achieved, in accordance with the principles of the present invention, by the combination of components in the manner and for the purpose herein to be described.

Figure 4:
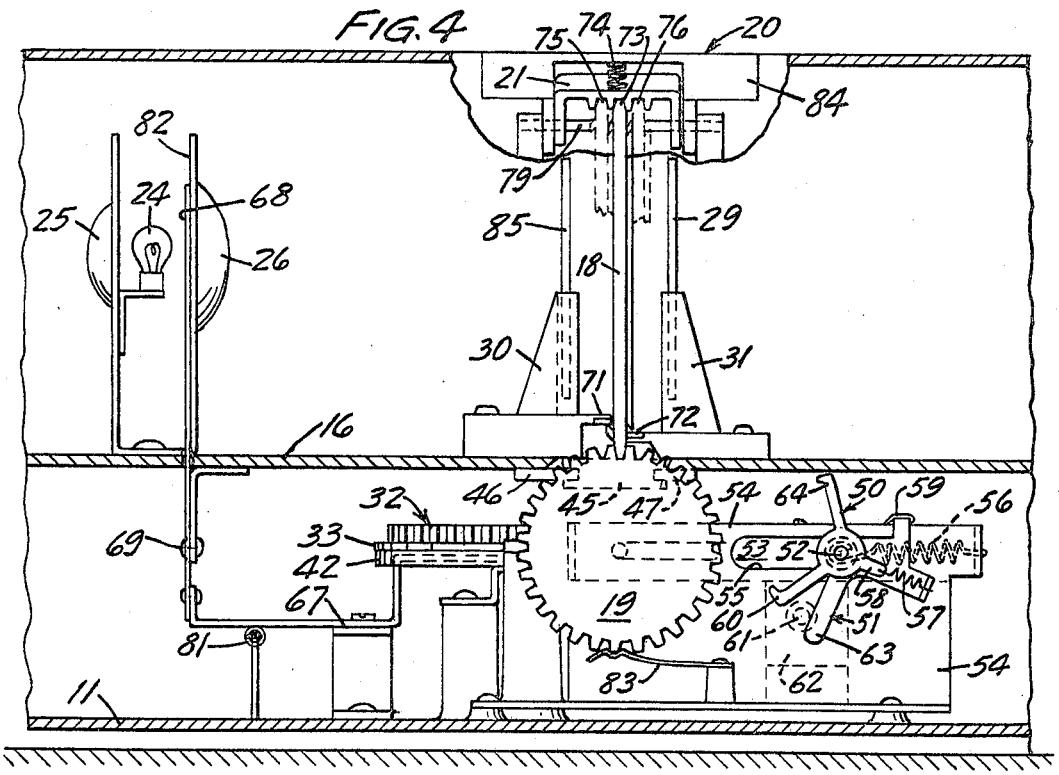
Figure 5:
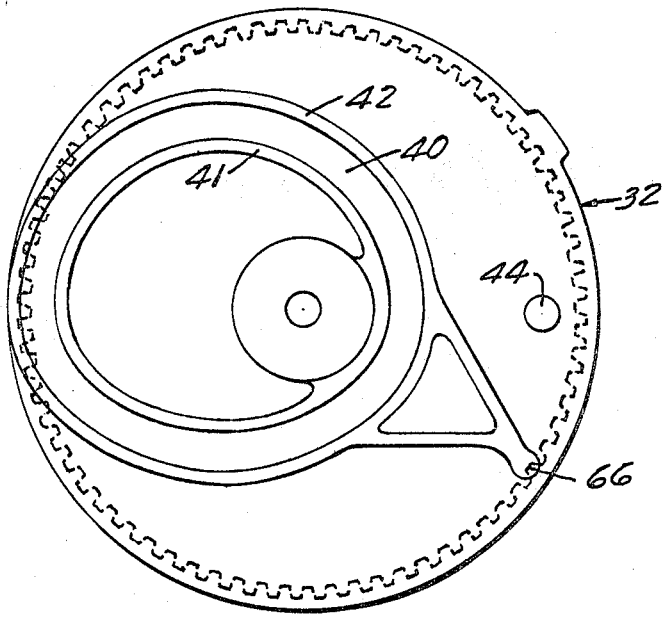
Figure 6:
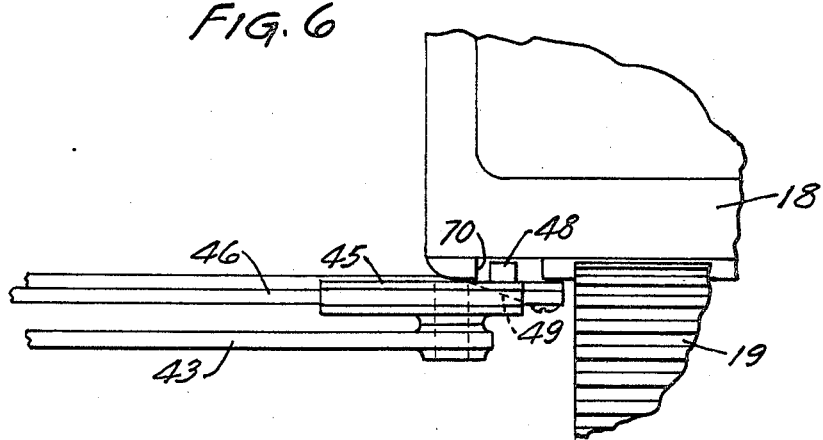

In the drawing,

FIGURE 1 is a view in perspective illustrating one embodiment of the projector, and showing a pack of slides in position for display, FIGURE 2 is a top plan view of the projector partly broken away to show interior details, FIGURE 3 is a sectional elevation taken approximately at line 3—3 of FIGURE 2, FIGURE 4 is a partial side elevation largely in section showing the slide advance system and a portion of the optical system, FIGURE 5 is a bottom plan view of the master cam and drive gear, FIGURE 6 is a detail view of a portion of the slide drive mechanism.

The projector 10 of FIGURE 1 is shown as enclosed within a case having lower portion 11 and upper portion 12. A projection optics assembly including a double convex lens element 13 is contained within a barrel 14 which is longitudinally adjustable by means of handwheel 15. A flat track 16 having a raised edge 80 serves as a support and retainer for a unified pack 17 of slides 18. An elongate indexing gear 19 advances the pack 17 to place any desired slide 18 in line with a stabilizer 20 which overhangs an edge of the pack. A removable door 22 permits access to the light source contained therebelow. A handle 23 is provided for convenience in transporting the projector, which may additionally include a close-fitting protective cover, not shown.

The light source, seen in FIGURES 2 and 4, includes a bulb 24, reflector 25, and condenser 26 in alignment with the axis of the projection lens system contained in the barrel 14. The position of the latter is adjustable, for focusing of a projected image, by means of handwheel 15 operating pinion 27 against a rack 28. In addition to the front lens element 13, the barrel 14 will normally contain a central double concave lens element and a rearward double convex lens element, or other equivalent projection optics structure. A suitable fan, not shown, forces cooling air past the bulb 24 and from the case through a louvered rear opening. The lens 26 covers an aperture in supporting plate 82.

Between the condensing lens 26 and the projection lens assembly there are located twin flat Fresnel condensing lens elements 85, 29, preferably equally spaced from a central film plane corresponding to the position of the plate or transparency during projection, and supported in brackets 30, 31 respectively. The Fresnel lens elements are designed so that the rays of light from the bulb 24 and lens 26 are directed substantially parallel to each other between the two elements and are then re-condensed toward the projection lens assembly to provide the desired focal length. The focal length may be altered by replacement of the single element 29 with an element of appropriately altered surface configuration. Since neither element is located at the film plane, the concentric or spiral ring structure of the elements is not noticeable in the projected image.

Drive mechanism for withdrawing a slide from the pack of slides into position for projection, for returning the slide to the pack, and for moving the pack into a next adjacent position, includes a peripherally toothed face cam 32 rotatively mounted on a swinging lever arm 33 and driven through a sprocket 34 mounted on the drive shaft 82, on which the arm 33 is pivoted, of an electric motor and gear reduction unit 35. The axle 36 by which cam 32 is mounted on arm 33 is adapted to move to and fro in a path defined by an arcuate slot 37 in the fixed supporting plate 38. The plate 38 carries as the cam follower a low friction peg 39 fitting within a channel 40 bounded by axially offset concentric rings 41, 42 extending from the under surface of cam 32 as seen in FIGURE 5. A connecting rod or pitman 43 extends from a peg 44 on the upper surface of cam 32 to a block 45 slidably mounted on ways 46, 47, best seen in FIGURE 4. The block 45 has an upwardly extending square boss 48 for making contact with a slide 18, and includes a wedge-shaped portion 49 (FIGURE 6) for a purpose subsequently to be described.

The elongate spur gear 19 extends slightly above the surface of the track 16 to mesh with the rack-like bottom of a pack of slides 17 suported on track 16 and to guide and support the slide which is to be withdrawn as well as the two adjacent slides. The gear 19 is rotated step-wise by a ratchet lever 50 which, together with a supporting frame 51, is suported on a pin 52 mounted on lever 53 slidably supported on frame 54. The latter is slotted as at 55 to permit to-and-fro sliding movement of pin 52, which is biased away from the gear 19 by a tension spring 56. Another tension spring 57 connecting an end of the frame 51 with a tab 58 on ratchet lever 50 serves to bias the latter in a direction determined by the position of said frame 51. A coil spring 59 extends from lever 53 around pin 52 to frame 51 and biases the latter into the position shown in FIGURE 4, with the lower ratchet arm 60 in position to make contact with gear 19.

The armature 61 of an electromagnet 62 occupies a position such that when extended it acts as a stop for extension 63 of frame 51, causing the latter to rotate as it is moved toward the gear 19 and thereby placing the ratchet 50 with its upper arm 64 biased for contact with said gear.

The lever 53 is caused to move against the tension of spring 56 by force exerted through lever 65 from lobe 66 of cam 32, thereby advancing the ratchet 50 against the gear 19 and causing the latter to rotate to the extent of one cog in either the advancing or the retracting direction depending upon the position of the armature 61. Lever 65 pivots about pin 78. A spring detent 83 provides for incremental rotation and aligned positioning of the gear 19.

The combination of rotative and arcuate motion imparted to the cam 32 makes possible an extended movement of the sliding block 45 and permits the use of a comparatively small-diameter cam to position the relatively large-sized slides 18, resulting in a compact projection apparatus.

As the transparency is brought into its projection position between the two Fresnel elements, the lobe 66 of the rotating cam 32 moves a slide 67 which in turn removes a shutter 68 supported at pivot 69 and normally covering the central exposure aperture in the plate 82 supporting the condensing lens 26. A tension spring 81 biases the shutter toward the closed position.

As described in U.S. application Ser. 557,487, the slides or mounts 18 each include angular elongate fins or ridges on each side, cooperatively located to permit adjacent slides to be dovetailed together to form a unified pack 17. Any individual slide may be slid laterally from the pack, a notch 70 being provided for the purpose. The slide is drawn into a slot between edge 71 of bracket 30 and edge 72 of bracket 31. These edges cooperate with the fins forming the mortise and tenon elements of the dovetail connection, at the lower portion of the slide 18, as shown in FIGURE 4, the edge 72 supporting the slide while the edge 71 assists in retaining it in position.

The upper edge of the slide 18 passes along an inner open-faced channel 73 in the cover member 21 of the stabilizer 20. The cover is pivotally supported on pin 79 near its rear end from the holder 84. A compression spring 74 urges the cover away from the holder and toward the position occupied by a slide during projection. In that position, the corners of slides adjacent the active slide are held firmly within outer channels 75, 76 provided at the outer end of the cover and adjacent the central channel.

As the active slide is restored to its position in the pack of slides by the motion of the cam 32, pitman 43 and block 45, the sloped end 49 of the block contacts and raises a plunger 77 which raises the end of the cover 21 against the compression of the spring 74 and thereby releases the several slides, permitting the pack of slides to be moved in either direction by step-wise rotation of the gear 19. The raised edge 80 retains the pack on the track 16 as the slide is pushed back into place.

It will be appreciated that switches, relays, means for connecting to a source of electric power, and other auxiliary apparatus will be included to enable the apparatus to fulfill its indicated function. Both automatic and manual control means are contemplated. The apparatus may be used to expose opaque printed slides, in which event the optical system may be omitted or appropriately modified.

The operation of the projector may be described as follows. A pack of slides carrying the transparencies to be projected is placed in position upon the track 16 and pushed forward until the first slide stands over the center of the gear 19. In this position the boss 48 lies within the notch 70 in the lower edge of the slide. The motor assembly 35 is then actuated to rotate the cam 32, drawing the slide from the pack and into the projection area while the remainder of the pack contacts the adjacent wall of the case 12. Withdrawal of the block 45 from its outward position permits the plunger 77 to fall, and the cover 21 then fits over the upper edge of the slide which is withdrawn from the pack between ways 46 and 47 and along channel 73. The next adjacent slide is meanwhile firmly held at its upper corner in channel 75 of the cover 21 and at its lower edge in the adjacent slot in the gear 19, thereby being accurately retained in position as the first slide is completely withdrawn from the pack.

As the slide nears its final position between the two Fresnel elements, the cam actuates the lever 67 thereby moving the shutter 68 to one side of the orifice in panel 82 and permitting passage of the light beam from the lamp 24 and reflector 25 towards the projection system. At this point the action terminates. The projected image is focused on the viewing screen by adjustment of the barrel 14 through handwheel 15.

After a desired viewing period, the motor unit is again activated. Rotation of the cam 32 now permits the shutter to close, drives the slide back into position in the stack, and then raises the plunger 77 and cover 21 to release the slides. The cam, coming into contact wth lever 65, next advances the lever 53 to bring the ratchet lever 50 into contact with the gear 19 and longitudinally move the pack of slides by the width of one slide.

Normally, the ratchet action will advance the pack and place the second slide in the operative position; whereupon the projection sequence will be repeated. During projection of the second slide, the first slide is supported with its upper corner in the channel 76 while the third slide occupies channel 75. Completing the action then returns the second slide, to re-form the unified pack.

Alternatively, as the return action is initiated the electromagnet 62 is actuated. The armature 61 is thereby extended to make contact with the lug 63 and cause rotation of the frame 51 and ratchet 50 to bring the upper ratchet arm 64 into position for stepping the gear 19 in the reverse direction and returning the previous slide to the projection position. The connecting spring 57 permits independent movement of the ratchet 50 during contact with the gear 19 while still maintaining the desired relationship between the ratchet and the frame 51. The shape of the camming surface on lever 65 provides relatively slow advancing motion of the ratchet assembly.

There is thus provided compact display mechanism for separating any desirerd slide or sequence of slides from an integrated pack of slides. The slide to be displayed is withdrawn completely from the pack, the remainder of which is stabilized so that the slide may be re-inserted. The withdrawn slide is rigidly supported in position for display, An optical system is provided which is compact and with which changes in focal length may be easily made.

What is claimed is as follows:

1. In an apparatus for exhibiting single slides of a pack of slides integrated in dovetailed face-to-back sliding contact, the combination comprising: supporting and retaining means for supporting said pack for longitudinal movement while preventing lateral displacement; withdrawing and re-inserting means for slidably removing a single slide from the remainder of said pack and for slidably replacing said single slide in said dovetailed integrated relationship with said remainder while said remainder is supported by said supporting and retaining means; and stabilizing means for immobilizing said remainder with respect to said supporting and retaining means during the removal, absence and return of said slide from said pack.

2. The apparatus of claim 1 wherein the withdrawing and re-inserting means includes a driving pinion on a fixed axis, a driven cam gear on a floating axis at a fixed distance from said fixed axis, a fixed follower for said cam gear, and connecting means for transmitting reciprocating motion from a point on said cam gear to said slide, said cam and said point being so selected and positioned as to produce a said motion of an extent substantially greater than the diamer of said cam gear.

3. The apparatus of claim 1 wherein said stabilizing means includes a floating cover having one end overlapping and biased toward the free face of said pack, centrally channeled to provide an open-faced channel for sliding entry of the free edge of said slide during withdrawal thereof, and terminally grooved at both sides of said channel to provide retaining grooves for slides positioned at either face of said slide in said pack; and means for lifting said cover out of engagement with said pack for permitting said longitudinal movement.

4. The apparatus of claim 1 including indexing means for providing incremental longitudinal movement of said pack of slides along said pack supporting means.

5. The apparatus of claim 4 wherein said indexing means comprises an elongate spur gear the adjacent teeth of which define channels for supporting a major length of the bottom edges of said slides, detent means for arresting rotation of said gear in single-channel increments, and ratchet means for rotating said gear in either direction.

6. The apparatus of claim 4 including slide anchoring means for supporting and retaining a slide which has been withdrawn from said pack by said withdrawing and re-inserting means and comprises a lower ledge and an upper ledge extending laterally from said supporting means in position to engage an edge of the tenon and mortise elements respectively of said slide upon withdrawal of said slide from said pack.

7. The apparatus of claim 1 useful as a projector for projecting light-images of projection transparencies framed within said slides and including indexing means for providing incremental longitudinal movement of said pack of slides along said supporting means, slide anchoring means for supporting and retaining a slide which has been withdrawn from said pack by said withdrawing means, and optical means for projecting on a viewing screen the focused light-image of a transparency framed in a said withdrawn slide.

8. The apparatus of claim 7 including said optical means two Fresnel lens elements one at each side of the projection film plane for directing light rays from a source into substantial parallelism while passing said film plane and into a condensed beam thereafter.

9. The apparatus of claim 7, wherein said stabilizing means includes a floating cover having one end overlapping and biased toward the free face of said pack, centrally channeled to provide an open-faced channel for sliding entry of the free edge of said slide during withdrawal thereof from said pack and into said anchoring means, and terminally grooved at both sides of said channel to provide retaining grooves for slides positioned at either face of said slide in said pack, and means for lifting said cover out of engagement with said pack for permiting said longitudinal movement; and wherein said indexing means includes an elongate spur gear the adjacent teeth of which define support channels for supporting a major length of the bottom edges of said slides, and detent means for arresting rotation of said gear in single-channel increments with one of said support channels in the plane of said open-faced channel and in line with said slide anchoring means.

References Cited

UNITED STATES PATENTS

| | | | |
|---|---|---|---|
| 2,907,128 | 10/1959 | Norton | 353—116 |
| 3,072,016 | 1/1963 | McCammon | 353—116 |

HARRY N. HAROIAN, Primary Examiner

U.S. Cl. X.R.

353—92, 118